Jan. 20, 1970     T. S. BINNER     3,490,299
INFINITELY VARIABLE RATIO ROTARY DRIVE
Filed June 19, 1968     2 Sheets-Sheet 1
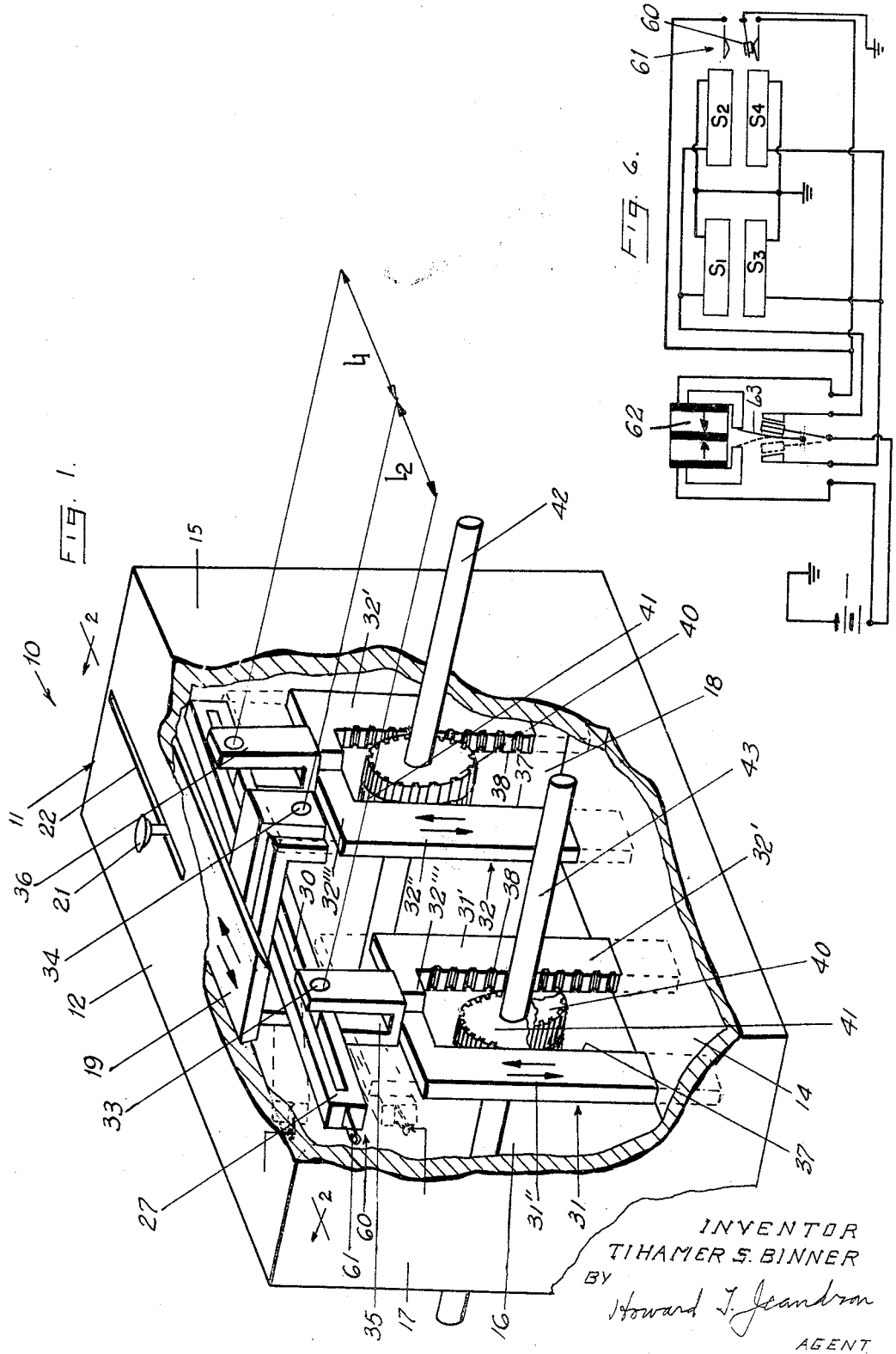
INVENTOR
TIHAMER S. BINNER
BY
Howard T. Jeandron
AGENT

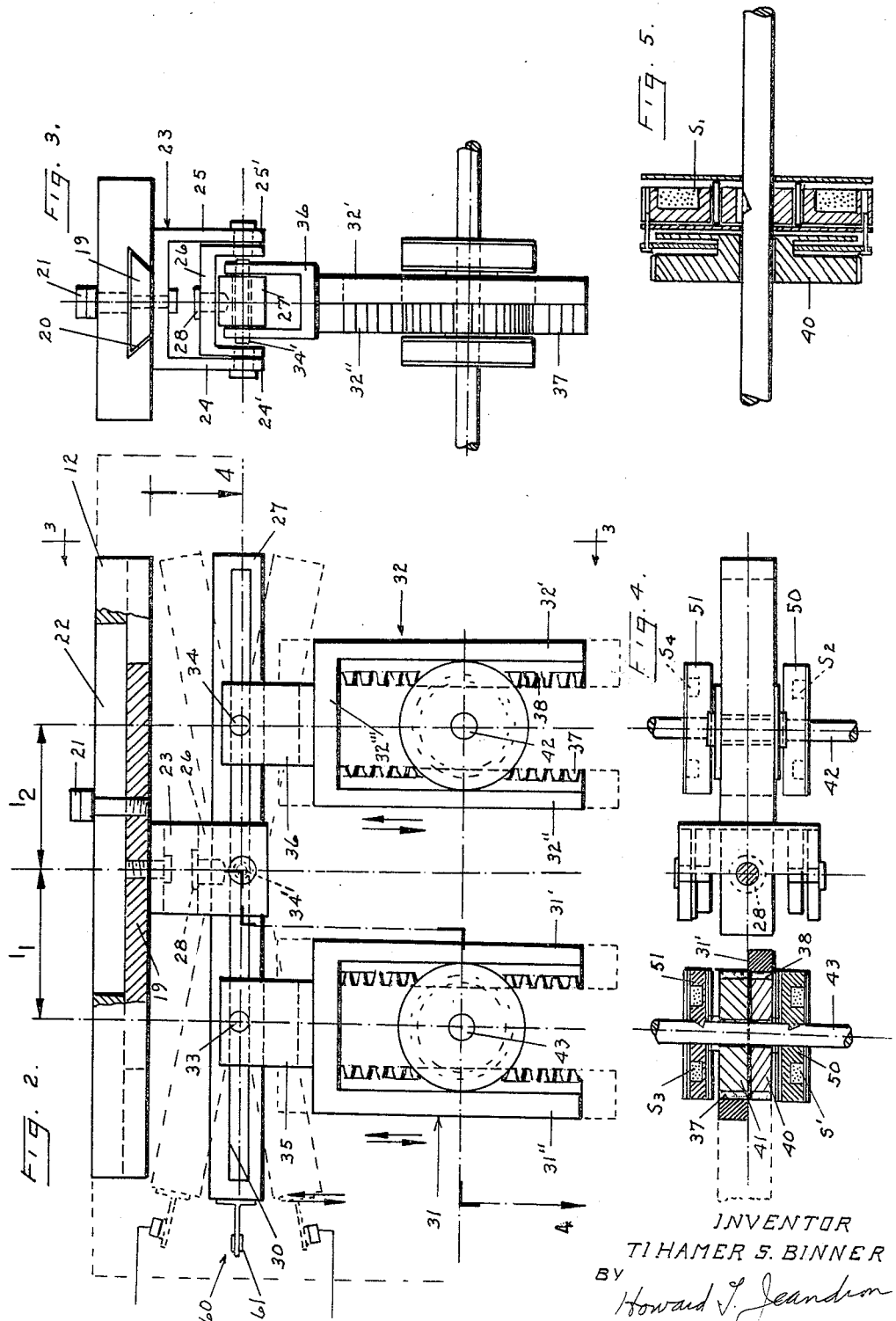

United States Patent Office 3,490,299
Patented Jan. 20, 1970

3,490,299
INFINITELY VARIABLE RATIO ROTARY DRIVE
Tihamer S. Binner, New Brunswick, N.J.
(304 West Point Ave., Somerset, N.J. 08873)
Filed June 19, 1968, Ser. No. 738,226
Int. Cl. F16h 21/12, 21/48, 25/08
U.S. Cl. 74—63                5 Claims

ABSTRACT OF THE DISCLOSURE

An infinitely variable speed reducer for a rotary drive that is two directional and provides a changeable ratio rotary drive and also provides high torque at low r.p.m.

---

This invention is related to an infinitely variable two directional speed reduce and more particularly to a changeable ratio rotary drive.

Prior art devices in the variable ratio transmission of driving power illustrate mechanical combinations of gears with fixed ratios requiring interruption of the connection and of the power transmitted to effectuate a change of ratio.

It is an object of this invention to provide a mechanical combination of gears and racks in opposed relation to transmit and effectuate an infinitely variable change of ratio of a rotary drive.

It is a further object of this invention to provide a mechanical combination of gears and racks in opposed relation to transmit and effectuate an infinitely variable change of ratio of a rotary drive to provide high torque at low r.p.m.

It is a further object of this invention to provide a mechanical combination of gears and racks in opposed relation to transmit and effectuate an infinitely variable change of ratio of a rotary drive in which the input and output shafts are interchangeable.

It is a further object of this invention to provide a mechanical combination of gears and racks in opposed relation that are engaged and disengaged by means of clutches to provide a continuous transmission of rotary drive to transmit and effectuate an infinitely variable change of ratio of a rotary drive.

Other objects of this invention shall be apparent by reference to the accompanying detailed description and the drawings in which FIG. 1 is a perspective illustration partially in cross section, FIG. 2 is a cross sectional view taken on line 2—2 of FIG. 1, FIG. 3 is an end view taken on line 3—3 of FIG. 2, FIG. 4 is a cross sectional view taken on line 4—4 of FIG. 2, FIG. 5 is a cross sectional view of the clutch and gear drive slightly enlarged, and FIG. 6 is a diagrammatic wiring diagram of the electrical clutch controls.

The device is simple and due to its small size and light weight is specially suited for applications in the transportation industry where infinitely variable speed in forward or reversed direction is necessary.

The operation of the infinitely variable speed reducer is illustrated in the attached drawings and referring to FIGS. 1–5 may be described as follows: The infinitely variable ratio rotary device 10 is mounted in a housing 11. The housing 11 is boxlike in form having a top 12, bottom 14, front 15, back 16, two sides 17 and 18. The mechanism illustrated in FIG. 2 is suspended from the top 12 but the suspension is movable, that is, the top 12 is provided with a slide member 19 mounted in an angular grooved track 20, FIG. 3. The member 19 is provided with an upright operating element 21 that protrudes above the top through a slot 22 so that, by means of element 21, slide 19 may be moved toward either side 17 or 18. This is the means to vary the ratio of the output shaft. A suspension element 23 is centrally attached to slide 19 in a rigid connection. The suspension element 23 is a U shaped element as illustrated in FIG. 3 having two extended legs 24 and 25. A pair of pivotal pins 24' and 25' are mounted on the same axis extending inward through legs 24 and 25. Mounted on pins 24' and 25' is a U shaped yoke 26. Suspended centrally within yoke 26 is a rack 27 suspended by a threaded bolt 28 to retain rack 27 rigidly affixed to yoke 26. Rack 27 extends either side of its suspended center bolt 28 and due to the pivotal mounting by pins 24' and 25' may be pivotally moved as illustrated in FIGS. 1 and 2. Rack 27 is provided with an elongated slot 30 that extends approximately the length of element 27 being closed at either end. Suspended from rack 27 are a pair of identical drive elements 31 and 32. Either element may be the drive element in which case the other element will be the driven element. Elements 31 and 32 are pivotally supported by pins 33 and 34, pins 33 and 34 passing through slot 30 of the rack 27. Element 31 is supported by a yoke 35 and element 32 is supported by a yoke 36. The yokes are identical. The yokes 35 and 36 are provided with an aperture centrally located in the upper portion of the yoke to be mounted upon the pins 33 and 34 in a pivotal relationship as illustrated in FIGS. 1, 2 and 3. Thus elements 31 and 32 are supported. Referring to elements 31 and 32, the yokes 35 and 36 are integrally formed in attached relationship with two racks 31', 31" and 32', 32" in parallel adjacent relationship. The racks are joined in different planes to form a yoke but are in abutting relationship to form an upper portion 31'" and 32'" and each having a pair of parallel extended gear racks, that is, racks 31' and 32' have a gear rack 38 on one side of the yoke while the extended rack 31" and 32" have a gear rack 37 on the opposite side of the yoke. Mounted within the yoke are a pair of gears 40 and 41, FIGS. 1 and 4, so that gear 40 meshes with rack gear 38 and gear 41 meshes with rack gear 37. Both gears 40 and 41 of rack 32 are mounted upon a shaft 42. Similarly the drive element 31 is identical with a central shaft 43. Both shaft 42 and 43 are mounted through the housing 11 in a fixed relationship to elements 31 and 32. The operation of the device may be as follows: using shaft 43 as the input shaft, when shaft 43 rotates presumably at the speed of a driving motor, the rotation of the shaft is transformed to a linear motion by the pair of gears 40 and 41 that are supported on shaft 43. Gears 40 and 41 rotate freely on shaft 43 and, as illustrated in FIG. 4, are provided with solenoid clutches 50 and 51. The solenoid clutches 50 and 51 are keyed to shaft 43. Thus the gears are coupled to the input shaft by means of the clutches 50 and 51. The racks 31' and 31" translate the force of the gear with which they mesh, one rack on the up stroke, the other rack on the down stroke of the yoke 31. In operation the gears are alternately engaged to the driving shaft 43 by means of the respective racks 31' and 31". Thus with gear 40, FIG. 4, rotating counter-clockwise, rack 31' will be moved upward until rack 31' reaches the limit of its upward movement when clutch 50 disengages gear 41 and clutch 51 engages gear 41. The method of controlling the operation of the clutches will be described later with reference to FIG. 6. With gear 41 engaged by clutch 51, the counter-clockwise rotation of gear 41 will drive rack 31" downward until rack 31" reaches the limit of its movement when the sequence of clutch 51 releases and clutch 50 engages and continues so that, with the rotation of shaft 43, rack 31 will move upward and downward to the limit of its movement in a continuous operation. With the oscillating movement of element 31, the movement will be translated through yoke 35, through pin 33 to rack 27 to move rack 27 in a similar oscillating movement about its pivotal center pin 34'. Thus the opposite end of rack 27 will be rocked in a similar oscillation moving pin 34 of element 32 up and down and transferring the force to element 32 so that gears 40 and 41 will engage gear racks 37 and 38 in the same fashion as described with relation to element 31. In similar fashion the clutches 50 and 51 of element 32 will engage the gears 40 and 41 for the limit of travel of each rack 32' and 32" rotating shaft 42 in identical relation to shaft 43. If both clutches 50 and both clutches 51 of elements 31 and 32 are energized to synchronized driving relation then shaft 43 rotating counter-clockwise will, by means of clutches 50, drive gear 40 counter-clockwise and gear 40 will drive rack 31' upward. Rack 27 will be oscillated with bearing 33 moving up and bearing 34 moving down. With bearing 34 moving downward rack 32' will rotate gear 40 clockwise and by means of clutch 50 will rotate shaft 42 clockwise. Similarly when the clutches 50 release and clutches 51 engage the counter-clockwise drive from shaft 43 by means of gear 41 will drive rack 31" downward thus oscillating rack 27 at bearing 33 downward. The opposite end of rack 27 will move upward and by means of bearing 34, rack 32" will also move upward. With this upward movement gear 41 will rotate clockwise to drive shaft 42 clockwise until rack 32" reaches the end of its travel when the clutches 51 are released and clutches 50 again engage, thus a continuous drive from shaft 43 to shaft 42. If instead shaft 42 were driven, then shaft 43 will respond in the same fashion.

If the engagement of clutches is changed, that is, if clutch 50 of element 31 is synchronized with clutch 51 of element 32 and clutch 51 of element 31 is synchronized with clutch 50 of element 32, then counter-clockwise rotation of shaft 43 will produce counter-clockwise rotation of shaft 42 or vice versa shaft 42 may drive shaft 43 in the same direction.

The clutches 50 and 51 may be controlled mechanically or electrically. For an example with the electrical control of the clutches, FIG. 6 illustrates diagrammatically the circuit and FIG. 4 illustrates the manner in which the engagement of the clutches is provided. If a solenoid is mounted in each clutch (FIG. 5) so that with the energization of a solenoid such as $S_1$, the gear 40 will be drawn into a magnetic bond with the rotating solenoid and will be released when solenoid $S_1$ is de-energized. To control the energizing and de-energizing of the solenoids at the proper time a switch 60 is mounted at one end of the oscillating rack 27, that is, the central contact 61 having a contact surface 60 on either side is connected to ground. With the oscillation of rack 27, contact 60 wll first contact one side of switch 61 to close a circuit through a differential relay 62 to draw its contact 63 to one side thus in turn closing a circuit from a battery 64 through the closed contact 63 to solenoids $S_1$ and $S_2$. When rack 27 reaches the end of its oscillation, the contact of switch 60 makes contact with the opposite side of switch 60, this closes a circuit to the differential relay 62 and contact 63 is drawn to the opposite side. This closes a circuit from battery 64 through contact 63 to solenoids $S_3$ and $S_4$. The continuous oscillation of switch 60 causes the repeated reversal of the energizing clutches as described as long as an input shaft is rotated. With pins 33 and 34 in an equal balanced relationship on rack 27, that is, as long as the distance $L_1$ and $L_2$, FIG. 1, are equal, the up and down stroke or the speed of the linear motion of the racks is determined by the relative position of the suspension element 34 (for identification $f$) which is located between the input and the output shafts. For example—if the suspension point ($f$) is near bearing 33 (for identification $d$) then $L_1 > L_2$ therefore the output speed $$V_1 = \frac{L_1}{L_2} V_2$$

which is larger than $V_2$. With $F_1$ as the distance from the suspension point to bearing 34 and $F_2$ as the distance from the suspension point to bearing 33, the following torque is expressed $L_2 F_2 = L_1 F_1$ from which $$F_1 = \frac{L_2}{L_1} F_2$$

therefore the driving force on the output shaft will be $F_1 < F_2$. If the suspension point or element ($f$) is located half way between bearings 33 ($d_1$) and 34 ($d_2$) then $L_2 = L_1$ therefore the input speed is equal to the output speed and the input torque equals the output torque.

If the suspension point or element ($f$) is nearer the output bearing 34 ($d_2$) then $L_1 < L_2$ therefore the output speed $$V_1 = \frac{L_1}{L_2} V_2$$

which is smaller than $V_2$ the torque will be $L_2 F_2 = L_1 F_1$ from which $$F_1 = \frac{L_2}{L_1} F_2$$

therefore the driving force on the output shaft is larger than on the input shaft $F_1$ or $F_2$. This means that the output shaft of the variable speed drive will provide high torque at low r.p.m.

It is apparent that the suspension point ($f$) or bearing 34 may be moved from a central point between bearings 33 and 34 by moving element 21 thus changing the ratio of the rotary drive by unbalancing the relationship of $L_1$ to $L_2$ and changing the torque and r.p.m. as desired.

Various changes may be made in the length of the gear racks or size of the gears or length of the oscillating rack to increase or decrease the torque and r.p.m. drive as desired without departing from the spirit of this invention and although an electical control has been illustrated for control of the clutches, other means may be similarly provided without departing from the spirit of this invention and although similar pinion gears and racks have been used with both the input drive and the output drive, it is to be understood that the gear ratios and racks may be changed to increase or decrease the torque and r.p.m. as desired without departing from the spirit of this invention and this invention shall be limited only by the appended claims.

What is claimed is:

1. An infinitely variable ratio rotary drive comprising an input shaft, an output shaft, a slotted bar with a pivotal axis, said pivotal axis movable in said bar, a pair of racks and pinion gears to couple said input shaft to one end of said bar and a pair of similar racks and pinion gears to couple said output shaft to the opposite end of said bar, means to transfer an input rotary drive to an output rotary drive and means to vary the ratio of said drive.

2. In a device according to claim 1 in which said device is two directional and said input and output shaft are interchangeable to drive with either shaft and provide output drive with either opposite shaft.

3. In a device according to claim 1 in which said input and output drive is through a pair of clutches in which one of said pair of clutches is always engaged and said clutches are alternately engaged.

4. In a device according to claim 1 in which said output shaft may be rotated in either the same direction as said input shaft or in an opposite direction.

5. In a device according to claim 1 in which said racks and pinion gears of said input shaft may be of a different ratio to said racks and pinion gears of said output shaft.

References Cited

UNITED STATES PATENTS

| | | | |
|---|---|---|---|
| 1,354,237 | 6/1920 | Boyd | 74—30 |
| 2,088,504 | 7/1937 | Brzezinski | 74—30 |
| 2,237,749 | 4/1941 | Simon | 74—34 |
| 2,441,854 | 5/1948 | Stolp | 74—34 |

FOREIGN PATENTS 1,318,192  1/1963  France.

FRED C. MATTERN, Jr., Primary Examiner

WESLEY S. RATLIFF, Jr., Assistant Examiner

U.S. Cl. X.R.

74—34, 125.5